United States Patent [19]

Komai et al.

[11] 4,260,692

[45] Apr. 7, 1981

[54] PROCESS FOR PRODUCING A METHYL METHACRYLATE SERIES POLYMER TRANSLUCENT OR OPAQUE PLATE

[75] Inventors: Takeshi Komai, Lawrence, Kans.; Masaru Matsushima, Aichi, Japan

[73] Assignee: Nippon Oil and Fats Co., Ltd., Tokyo, Japan

[21] Appl. No.: 88,793

[22] Filed: Oct. 29, 1979

[30] Foreign Application Priority Data

Nov. 1, 1978 [JP] Japan ................................ 53-133781

[51] Int. Cl.$^3$ .......................................... C08F 257/02
[52] U.S. Cl. ................................ 525/273; 260/42.52; 525/309; 525/904
[58] Field of Search ................................ 525/273, 309; 260/42.52

[56] References Cited

U.S. PATENT DOCUMENTS

| 3,706,818 | 12/1972 | Mageli et al. | 525/273 |
| 3,883,617 | 5/1975 | Krieg et al. | 525/309 |
| 3,991,109 | 11/1976 | D'Angelo et al. | 525/273 |

*Primary Examiner*—Carman J. Seccuro
*Attorney, Agent, or Firm*—Blanchard, Flynn, Thiel, Boutell & Tanis

[57] ABSTRACT

When polystyrenes having peroxy bonds therein are charged into a polymerization system of methyl methacrylate series monomers, the said polystyrenes act as an opaquing agent and a polymerization initiator.

The obtained opaque or translucent plate is splendid in optical and mechanical properties.

1 Claim, No Drawings

PROCESS FOR PRODUCING A METHYL METHACRYLATE SERIES POLYMER TRANSLUCENT OR OPAQUE PLATE

This invention relates to an opaque or translucent plate made of methyl methacrylate series polymer and which is splendid in optical and mechanical properties.

Methyl methacrylate series polymer, opaque plates are useful as materials of illuminators, signboards, electric apparatus, mechanical equipment and the like, because they are very lustrous and excellent in chemical resistance, weather resistance and electric insulating resistance.

Hereinafter, the term "methyl methacrylate series polymer opal plate" means an opal plate and a coloured opaque plate.

Heretofore, the methyl methacrylate series polymer opal plates have been produced by a process comprising dispersing or dissolving a pigment paste mixed with a plasticizer and a white pigment, such as titanium oxide, barium sulphate and the like, as an opaquing agent, polystyrene, low molecular weight polystyrene (molecular weight: about 10,000) styrene—methyl methacrylate copolymer and the like, into prepolymers of methyl methacrylate (syrup), pouring the resulting mixture into a mold and subjecting the same to a preliminary polymerization and an after polymerization.

Heretofore, conventional methyl methacrylate coloured opaque plates have been produced by using a coloring agent such as coloured pigment, dye and the like, jointly with the said opaquing agent in producing the said opal plate.

However, the aforementioned conventional methods have the following disadvantages.

Namely, a procedure of using the said pigment paste as an opaquing agent generally imparts a sufficient opal effect to the resulting product, but the light transmissivity thereof is very small. Accordingly, for upgrading the light transmissivity, the amount used of the pigment paste must be decreased, with the result being that the opal effect is decreased.

A procedure of using polymers such as said polystyrene as an opaquing agent nearly makes the resulting product satisfactory in relation to the opal effect and the light transmissivity thereof, but it has disadvantages in that polystyrenes which were charged in the course of the polymerization are apt to aggregate and impart irregularly striped patterns to the resulting product.

These faults appear more often, as the molecular weight of the said polymer becomes larger and as the amount used thereof becomes larger. The opaquing agents used in the conventional methods are distributed in the resulting product in the state of being mixed with the methyl methacrylate polymer, but not in a state of a chemical combination of the two.

Accordingly the resulting products have troubles in that their mechanical properties are easily injured. Very often when methyl methacrylate series polymer opal plates are bent or subjected to a vacuum forming process, they have the defect that the surface luster becomes dull and cracks occur owing to the above mentioned troubles.

SUMMARY OF THE INVENTION

An object of the present invention is to provide a methyl methacrylate series polymer translucent or opal plate which possesses splendid optical and mechanical properties and there does not occur striped patterns owing to aggregation of an opaquing agent.

Another object of the present invention is to provide a methyl methacrylate series polymer translucent or opaque plate which when it is bent or subjected to vacuum forming, striped patterns will not occur therein owing to aggregation of an opaquing agent.

The present invention is based on the discovery that polystyrene having peroxy bonds therein acts as an opaquing agent and a polymerization initiator, when it is charged into polymerization system of methyl methacrylate monomer and that during the polymerization, the peroxy bond of the polystyrene having peroxy bonds therein cleaves, whereby the polystyrene having the peroxy bonds therein is copolymerized with methyl methacrylate monomer, and that in the resulting opaque plate, the said polystyrene used as an opaquing agent is chemically combined with methyl methacrylate polymers completely.

The methyl methacrylate series polymer translucent or opaque plate, according to the present invention, is prepared by polymerizing styrene monomers with a diacyl type polymeric peroxide having the following general formula, thereby obtaining a polystyrene having peroxy bonds therein, dissolving the said polystyrene having peroxy bonds therein as an opaquing agent into methyl methacrylate monomers, or prepolymers of methyl methacrylate, and subjecting the resulting solution to a cast polymerization, thus copolymerizing the polystyrene having peroxy bonds therein with methyl methacrylate.

$$\left[\begin{array}{cccc} O & O & O & O \\ \parallel & \parallel & \parallel & \parallel \\ -CR_1COR_2OCR_1COO \end{array}\right]_n \quad (1)$$

Wherein $R_1$ is an alkylene group having 1–15 carbon atoms or a phenylene group and $R_2$ is an alkylene group having 2 to 10 carbon atoms, $-(CH_2)_2O\ (CH_2)_2-$ group, $-(CH_2)_2O\ (CH_2)_2O\ (CH_2)_2-$ group,

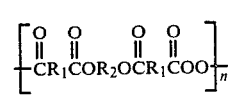

and n is 2 to 20.

The polystyrene having peroxy bonds therein used in the present invention, can be easily obtained by polymerizing styrene monomers using the diacyl type polymeric peroxide having ester bonds therein as a polymerization initiator by a conventional bulk polymerization method, a suspension polymerization method or a solution polymerization method.

The amount of the diacyl type polymeric peroxide having ester bonds therein used in this polymerization is 0.5–10 parts by weight based on 100 parts by weight of styrene monomers.

The polymerization temperature is preferably 60°–90° C. and the polymerization time is preferably 2–6 hours. Illustrative diacyl type polymeric peroxides having ester bonds therein are as follows.

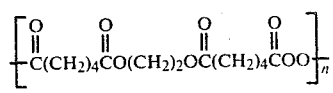

-continued

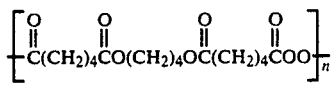

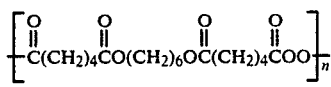

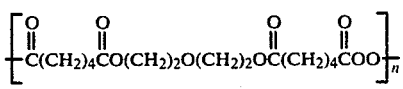

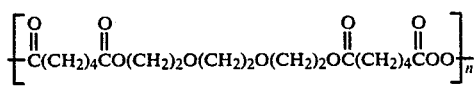

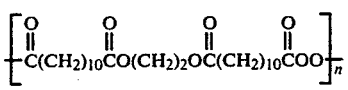

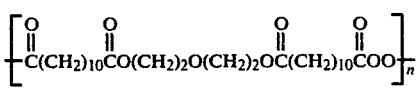

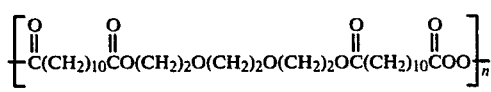

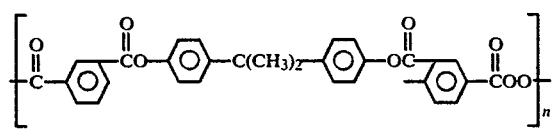

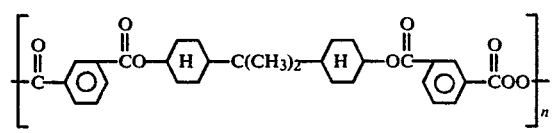

(n = 2 ~ 20)

In carrying out the present invention, after the polystyrene having the peroxy bonds therein is dissolved uniformly in the methyl methacrylate monomers or the methyl methacrylate prepolymers (syrup), the resulting solution may be subjected to a conventional cast polymerization.

The process of the present invention may be carried out according to the process of the conventional method. Namely an opaque plate can be obtained by a process comprising dissolving uniformly the polystyrene having peroxy bonds therein into methyl methacrylate monomers, subjecting the resulting solution to a prepolymerization, thus obtaining a syrup whose conversion ratio of monomer to polymer in the prepolymerization was 10–30 wt. %, pouring the obtained syrup into a mold and subjecting the syrup to a cast polymerization according to the conventional method. The amount used of the polystyrene having peroxy bonds therein as an opaquing agent may be adjusted in relation to the opacity and thickness of the opaque plate required.

Generally, the amount used thereof is preferably 0.5–20 parts by weight based on 100 parts by weight of the methyl methacrylate monomers.

When the amount used of polystyrene having peroxy bonds therein is less than 0.5% by weight, per 100 parts by weight of methyl methacrylate monomers, the opal effect thereof becomes incomplete.

When the amount used of the polystyrene having peroxy bonds therein exceeds 20% by weight based on 100 parts by weight of methyl methacrylate monomers, it injures the original properties of the methyl methacrylate series polymer opaque plate (good weather resistance and good chemical resistance).

Further, the amount used of the colouring agents such as coloured pigments, dyes and the like which are used with the polystyrene having peroxy bonds therein, may be suitably determined by the kind of the colouring agent, the depth of the colour required and the like.

Generally, the amount used of the colouring agent is preferably less than 5% by weight, per 100 parts by weight of the methyl methacrylate monomers.

The polymerization conditions in the prepolymerization of the cast polymerization may be carried out according to the same conditions as done in the conventional methods. For example, in the prepolymerization conditions, the polymerization temperature is 60°–90° C. and the polymerization time is about 1–2 hours. Concerning the prepolymerization conditions in the cast polymerization, the polymerization temperature is 40°–70° C. and the polymerization time is about 4–10 hours.

Regarding the after polymerization conditions therein, the polymerization temperature is 100°–120° C. and the polymerization time is about 2–6 hours.

According to the present invention, the polystyrene having peroxy bonds therein which is used as an opaquing agent, also acts as a polymerization initiator. Along with the cleavage of the peroxy bonds in said polystyrene having peroxy bonds therein, the polymerization reaction is commenced.

Accordingly, there is no necessity of using other particular polymerizaton initiators. But when the amount used of polystyrene having peroxy bonds therein is small (less than 5% by weight, per 100 parts of methyl methacrylate monomers), as the polymerization rate becomes slow, it is preferable to use the same jointly with a conventional polymerization initiator such as benzoyl peroxide, lauroyl peroxide, azobisisobutyronitrile and the like.

According to the present invention, when the amount used of the polystyrene having peroxy bonds therein is less than 20% by weight, per 100 parts of the methyl methacrylate monomers, one or more of acryl series monomers comprising acrylic acid, methacrylic acid, alkyl acrylate and alkyl methacrylate may be jointly used with the methyl methacrylate. For the present invention, conventional fillers may be used without any troubles.

According to the present invention, the polystyrene having peroxy bonds therein which used as an opaquing agent acts also as a polymerization initiator and from the polymerization mechanism thereof, along with cleavage of the peroxy bonds in the molecules of the polystyrene having peroxy bonds therein, they do undergo block polymerization with methyl methacrylate series monomers.

Accordingly the polystyrene having peroxy bonds therein used as the opaquing agent is combined with the methyl methacrylate series monomers chemically and the obtained opaque plate is different essentially from the conventional ones.

According to the present invention, no striped pattern occurs in the obtained opaque plates owing to aggregation of the opaquing agent and it is very lustrous and splendid in optical and mechanical properties.

PREFERRED EMBODIMENTS OF THE INVENTION

Hereinafter, part and % shall mean part by weight and % by weight respectively.

[Preparation of polystyrene having peroxy bonds therein]

Preparation 1.

Into a flask having four openings which is equipped with a thermometer, a stirrer and a reflux condenser, there were added 100 parts of styrene, 8 parts of

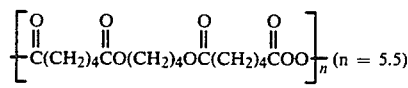

and 250 parts of 0.5% aqueous solution of polyvinyl alcohol and the contents of the flask were subjected to polymerization at 75° C. for 3 hours while introducing nitrogen gas.

The resulting product was washed with water, followed by drying under vacuum, whereby 102 parts of polystyrene having peroxy bonds therein, which were in a pearl state, were obtained.

The obtained polystyrene having peroxy bonds therein (hereinafter designated as PO-PS (1)) was about 50,000 in the mean molecular weight thereof and number of peroxy bonds per one molecule thereof was 2.5 (mean value).

Preparation 2.

In the same flask as used in Preparation 1. there were placed 100 parts of styrene, 8 parts of

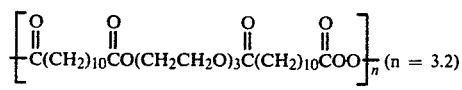

and 250 parts of 0.5% aqueous solution of polyvinyl alcohol and the contents of the flask were subjected to polymerization at 75° C. for 3 hours while introducing nitrogen gas therein, and the resulting product was washed with water, followed by carrying out vacuum drying, whereby 98 parts of polystrene having peroxy bonds therein (hereinafter designated as PO-PS (2)) were obtained.

The obtained PO-PS (2) was about 80,000 in the mean molecular weight thereof and had 1.5 in the mean value of peroxy bonds per one molecule.

Preparation 3.

In the same flask as used in Preparation 1, 100 parts of styrene monomer, 4 parts of

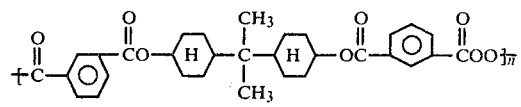

and 250 parts of 0.5% aqueous solution of polyvinyl alcohol were charged. The contents of the flask were subjected to polymerization at 80° C. for 3 hours while introducing nitrogen gas therein. The resulting product was washed with water, followed by carrying out vacuum drying, whereby 104 parts of polystyrene having peroxy bonds therein (hereinafter designated as PO-PS (3)) were obtained.

The mean molecular weight of the obtained PO-PS (3) was about 45,000 and the average number of peroxy bonds per one molecule of the polystyrene was 2.8.

EXAMPLE 1-8, Comparative 1-3

In a flask having four openings which was equipped with a thermometer, a stirrer and a reflux condenser, a methyl methacrylate monomer, an opaquing agent, a coloring agent and a polymerization initiator were charged respectively according to the mixing ratio as shown in Table 1. The respective contents of the flask were subjected to polymerization at 75° C. for one hour while introducing nitrogen gas therein and then they were allowed to cool to room temperature, whereby a prepolymer syrup whose polymerization conversion was 20%, was obtained.

The respective prepolymer syrups which were defoamed at reduced pressure, were poured into a cell of tempered glass whose thickness was adjusted to be 3 mm and they were subjected to a prepolymerization in a water bath at 60° C. for 4 hours, followed by carrying out an after polymerization in an air bath at 110° C. for 2 hours, whereby respective translucent or opaque plate whose thickness were 3 mm, were obtained.

TABLE 1

| | Methyl Methacrylate | Mixing ratio of starting materials | | | | | | Colouring agent | | | Polymerization initiator |
|---|---|---|---|---|---|---|---|---|---|---|---|
| | | Opaquing agent | | | | | | | | | |
| | | PO-PS (1) | PO-PS (2) | PO-PS (3) | PS-1 | PS-2 | St-MMA | PYHG | PRH | PBG | |
| Example 1 | 99 | 1 | | | | | | | | | 0.2 |
| 2 | 95 | 5 | | | | | | | | | |
| 3 | 90 | 10 | | | | | | | | | |
| 4 | 95 | | 5 | | | | | | | | |
| 5 | 95 | | | 5 | | | | | | | |
| 6 | 95 | 5 | | | | | | 0.03 | | | |
| 7 | 95 | 5 | | | | | | | 0.03 | | |
| 8 | 95 | 5 | | | | | | | | 0.03 | |
| Comparative | | | | | | | | | | | |
| Example 1 | 95 | | | | 5 | | | | | | 0.5 |
| 2 | 95 | | | | | 5 | | | | | 0.5 |

TABLE 1-continued

| | Methyl Methacry-late | Mixing ratio of starting materials | | | | | | Colouring agent | | | Polymeri-zation initiator |
|---|---|---|---|---|---|---|---|---|---|---|---|
| | | Opaquing agent | | | | | | | | | |
| | | PO-PS (1) | PO-PS (2) | PO-PS (3) | PS-1 | PS-2 | St-MMA | PYHG | PRH | PBG | |
| 3 | 95 | | | | | | 5 | | | | 0.5 |
| 4 | 95 | | | | | 5 | | 0.03 | | | 0.5 |
| 5 | 95 | | | | | 5 | | | 0.03 | | 0.5 |
| 6 | 95 | | | | | 5 | | | | 0.03 | 0.5 |

Note.
PO-PS(1):Polystyrene having peroxy bonds therein prepared by Preparation 1
PO-PS(2):Polystyrene having peroxy bonds therein prepared by Preparation 2
Polymerization initiator:lauroyl peroxide
PO-PS(3):Polystyrene having peroxy bonds therein prepared by Preparation 3.
PS-1:Conventional polystyrene whose average molecular weight is about 5,0000
PS-2:Conventional polystyrene whose average molecular weight is about 10,000
St-MMA:Copolymer of Styrene (St) with Methyl methacrylate (MMA) (St/MMA = 8/2)
PYHG:Yellow pigment (Product of Mitsubishi Chemical Industries Co., Trade Mark: Diaresin Yellow HG)
PRH:Red pigment (Product of Mitsubishi Chemical Industries Co., Ltd. Trade Mark: Diaresin Red H)
PBG:Blue pigment (Product of Mitsubishi Chemical Industries Co., Ltd. Trade Mark: Diaresin Red G)

The obtained respective opaque plates were examined about their appearance, optical properties and mechanical properties according to Japanese Industrial Standard Method K-6718 and the obtained results are shown in Table 2.

TABLE 2

| | Properties of Translucent or opaque Plate | | | | | | |
|---|---|---|---|---|---|---|---|
| | Optical properties | | | | Mechanical Properties | | |
| | Uniformity of product | Light transmissivity | Diffused light transmissivity | Degree of whiteness | Tensile strength (kg/cm$^2$) | Barcol hardness | Colour |
| Example 1 | ◉ | 69.0 | 66.5 | 22.1 | 780 | 54 | opal |
| 2 | ◉ | 60.5 | 58.0 | 31.3 | 770 | 52 | opal |
| 3 | ◉ | 51.0 | 47.5 | 45.6 | 770 | 52 | opal |
| 4 | ◉ | 59.5 | 57.0 | 30.2 | 770 | 53 | opal |
| 5 | ◉ | 61.0 | 59.0 | 33.6 | 760 | 53 | opal |
| 6 | ◎ | 56.0 | 53.5 | — | 760 | 52 | yellow-opaque |
| 7 | ◎ | 53.5 | 49.0 | — | 770 | 53 | red-opaque |
| 8 | ◎ | 51.0 | 47.0 | — | 770 | 53 | blue-opaque |
| Comparative Example 1 | X | 54.5 | 52.0 | 30.5 | 670 | 45 | opal |
| 2 | Δ | 58.5 | 56.5 | 24.0 | 680 | 46 | opal |
| 3 | Δ | 68.5 | 65.0 | 12.9 | 690 | 48 | opal |
| 4 | Δ | 52.0 | 48.0 | — | 680 | 45 | yellow-opaque |
| 5 | Δ | 48.5 | 45.0 | — | 670 | 45 | red-opaque |
| 6 | Δ | 46.0 | 42.0 | — | 670 | 46 | blue-opaque |

Note:
◎: Occurrence of striped patterns is not recognized
Δ: Small amount of occurrence of striped patterns is recognized
X: Occurrence of striped patterns is recognized From table 2, it is recognized that the methyl methacrylate series polymer opaque plate of the present invention is superior to the conventional opaque plates in the optical and mechanical properties and occurrence of striped patterns owing to the fact that aggregation of the opaquing agents is not seen because according to the present invention, the opaquing agent is chemically combined with the methyl methacrylate polymers by means of block polymerization.

When the opaque plate of the present invention is compared with the conventional opaque plates when the same quantity of the opaquing agent is used for the two (Examples 2, 4 and 5, Comparative Examples 1-3), the former is high in both light transmissivity and degree of whiteness. However some of the latter is high in light transmissivity but is short in the degree of whiteness and others are high in the degree of whiteness but are short in light transmissivity.

Further it is recognized that the former is remarkably better compared to the latter in mechanical strength.

The embodiments of the invention in which an exclusive property or privilege is claimed are defined as follows.

1. A process for preparing a translucent or opaque sheet, which comprises: polymerizing 100 parts by weight of styrene monomer with from about 0.5 to 10 parts by weight of peroxide having the formula

wherein
$R_1$ is alkylene having 1 to 15 carbon atoms or phenylene, $R_2$ is alkylene having 2 to 10 carbon atoms, $-(CH_2)_2O(CH_2)_2-$, $-(CH_2)_2O(CH_2)_2O(CH_2)_2-$

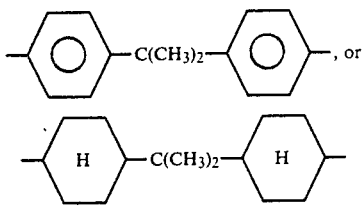

and n is a number from 2 to 20
at a temperature of from about 60° to about 90° C., for from about 2 to about 6 hours, to obtain polystyrene having peroxy groups therein; then partially polymerizing a mixture comprised of from about 0.5 to about 20 parts by weight of said polystyrene having peroxy groups therein and 100 parts by weight of second monomer consisting essentially of more than 80 wt. % of methyl methacrylate and less than 20 wt. % of one or more acrylic monomers and optionally a coloring agent at a temperature of from about 60° to about 90° C., for from about 1 to about 2 hours, to convert about 10 to about 30 wt. % of said second monomer to polymer whereby to obtain a syrup; then casting said syrup into a sheet-forming mold and maintaining the contents of said mold at a temperature of from about 40° to about 70° C., for from about 4 to about 10 hours, followed by heating at from about 100° to about 120° C. for from about 2 to about 6 hours, whereby to obtain a translucent or opaque sheet.

* * * * *

UNITED STATES PATENT OFFICE
CERTIFICATE OF CORRECTION

Patent No. 4 260 692          Dated April 7, 1981

Inventor(s) Takeshi Komai et al

It is certified that error appears in the above-identified patent and that said Letters Patent are hereby corrected as shown below:

Column 8, lines 63-64; delete the formula in its entirety and replace by the following formula $$--- \quad {\left[ \overset{\overset{O}{\|}}{C} R_1 \overset{\overset{O}{\|}}{C} O R_2 O \overset{\overset{O}{\|}}{C} R_1 \overset{\overset{O}{\|}}{C}OO \right]}_n \quad ---.$$

Signed and Sealed this

*Fourteenth* Day of *July 1981*

[SEAL]

*Attest:*

*Attesting Officer*

GERALD J. MOSSINGHOFF

*Commissioner of Patents and Trademarks*